US008320150B2

(12) United States Patent
Blanc et al.

(10) Patent No.: US 8,320,150 B2
(45) Date of Patent: Nov. 27, 2012

(54) STRUCTURE AND METHOD FOR BACKING UP AND RESTITUTION OF DATA

(75) Inventors: Frédéric Blanc, Bures sur Yvette (FR); Raphaël David, Bures sur Yvette (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 213 days.

(21) Appl. No.: 12/739,692

(22) PCT Filed: Oct. 17, 2008

(86) PCT No.: PCT/EP2008/064077
§ 371 (c)(1),
(2), (4) Date: Nov. 30, 2010

(87) PCT Pub. No.: WO2009/053318
PCT Pub. Date: Apr. 30, 2009

(65) Prior Publication Data
US 2011/0063884 A1    Mar. 17, 2011

(30) Foreign Application Priority Data

Oct. 23, 2007   (FR) ..................................... 07 07412

(51) Int. Cl.
*G11C 5/06* (2006.01)
*G11C 5/02* (2006.01)
(52) U.S. Cl. ........................................ 365/63; 365/51
(58) Field of Classification Search ................ 365/51, 365/63
See application file for complete search history.

(56) References Cited

U.S. PATENT DOCUMENTS

| | | |
|---|---|---|
| 5,844,422 A | 12/1998 | Trimberger |
| 6,085,275 A * | 7/2000 | Gallup et al. ............... 710/316 |
| 6,507,211 B1 | 1/2003 | Schultz |
| 2002/0107952 A1 * | 8/2002 | Mancusi et al. ............ 709/223 |

FOREIGN PATENT DOCUMENTS

WO    WO 02/071248 A    9/2002

OTHER PUBLICATIONS

Enzler, R. et al., "Co-Simulation of a Hybrid Multi-Context Architecture"; International Conference on Engineering of Reconfigurable Systems and Algorithms, Jun. 1, 2003; pp. 174-180, XP002349309.
PCT International Search Report No. PCT/EP2008/06477 dated Dec. 12, 2008.
French Search Report from the PCT Office for International Application No. PCT/EP2008/064077 dated Jun. 25, 2008.

* cited by examiner

*Primary Examiner* — Ly D Pham
(74) *Attorney, Agent, or Firm* — Stroock & Stroock & Lavan LLP (57) ABSTRACT

A structure and a method for backing up and restitution of data allowing management of a memory space. The backup and restitution structure includes a matrix of connectors distributed in line and in column, on said matrix. Each connector of one line is connected to its two adjacent connectors. Each connector of one column is connected to its two adjacent connectors. Each line of connectors is connected to a memory of the first-in, first-out type, by a connector situated at one end of the line. Each column of connectors is connected to an input and, or output port of a data stream of the structure by a connector situated at one end of the column. Each connector propagates a data stream. An embodiment is suitable for an onboard computing system including a component, associating a computing structure and a memory space produced for example on one electronic circuit board.

10 Claims, 5 Drawing Sheets

STRUCTURE AND METHOD FOR BACKING UP AND RESTITUTION OF DATA

CROSS-REFERENCE TO PRIOR APPLICATIONS

This application is the U.S. National Phase application under 35 U.S.C. §371 of International Application No. PCT/EP2008/064077, filed Oct. 17, 2008, and claims the benefit of French Patent Application No. 0707412, filed Oct. 23, 2007, all of which are incorporated by reference herein. The International Application was published on Apr. 30, 2009 as WO 2009/053318.

BACKGROUND OF THE INVENTION

The present invention relates to a structure and a method for backing up and restitution of data allowing management of a memory space. The present invention is notably suitable for an onboard computing system comprising a component, associating a computing structure and a memory space produced for example on one and the same electronic circuit board.

BRIEF DESCRIPTION OF THE PRIOR ART

The present invention applies notably to the requirements of data interchange between data stream applications implemented on multitasking processing structures that can be programmed or reconfigured dynamically. Such processing structures may for example be processors, programmable logic circuits. The data stream applications are notably used in onboard systems having heavy constraints in matters of integration and manufacturing cost. Data stream applications may be used by multitasking processing structures integrated into systems having data backup and restitution requirements. Such systems, having data backup and restitution requirements may be: telecommunication equipment, image processing equipment, data compression and decompression equipment, data encryption and decryption equipment, computer network equipment, electronic circuit configuration systems for reconfigurable architectures, measurement equipment, acquisition equipment, display equipment.

The processes used by a data stream application are a succession of elementary tasks modifying one or more input data streams in order to produce one or more output data streams. Each elementary task consumes the input data in order to modify them and produce new information: the output data. A data stream application follows a model of the producer-consumer type. The order of execution of the elementary tasks is notably determined by data dependencies that can exist between the data consumed by the tasks and the data generated by other tasks. The volume of data interchanged between the various tasks can vary as a function of the elementary tasks put into play by the application: the ratio between the volume of data produced and the volume of data consumed is not necessarily constant.

In the case of an absence of dependency between several elementary tasks, the latter may be executed concurrently on one and the same computing resource of the system or in parallel on two distinct computing resources of the system.

If the processes of the application have to be interrupted, it is necessary to back up the data streams coming out of the various tasks already accomplished in order to be able to resume the application processes later. Resuming the processes of the application requires restitution of the data streams being input to the consuming tasks. A particular case of this type of mechanism is found in reconfigurable architectures that can be used in onboard systems. A reconfigurable architecture is a hardware structure of which the resources can be adapted in order to carry out a desired process. Such an architecture allows, during processing, a reconfiguration of a portion or of all of its internal architecture in order to carry out the application or a sub-portion of a complete application. Therefore several reconfigurations may be necessary in order to carry out the whole of the application. This use of a reconfigurable circuit is called dynamic. A difficulty of carrying out the dynamic reconfiguration is the recovery of execution data from a configuration corresponding to a sub-portion of the processes of the application in order to transfer them to a subsequent sub-portion, so that the reconfigurations do not have an influence on the total application. The data necessary during a transition from one sub-portion to another sub-portion are grouped together in an entity called context. Each context can be transmitted in the form of a data stream to a memory. The data contained in each context may be nonuniform, that is to say variable in number, in size and in frequency of transmission. The contexts are produced during the execution of a sub-portion of the application. The context data are therefore dynamic and not determined before the execution of the sub-portion of the application.

The use of a reconfigurable dynamic architecture that is powerful, notably in terms of processing speed, therefore requires data stream management systems capable of managing a nonuniformity of the data streams notably during a backup and a restitution of these data in a change of context.

Devices for managing data streams to be backed-up and restituted exist for several types of systems architectures including notably:
- architectures of the programmable logic circuit type or FPGA for Field Programmable Gate Array;
- data-flow architectures;
- stream-processor architectures.

In the case of field programmable gate arrays, the data are interchanged by means of a main memory. Memory zones are allocated dynamically in the main memory in order to create zones of interchange between producer and consumer. This solution is very flexible but does not make it possible to support the parallel processing of tasks. It is moreover very greedy in terms of silicon surface area and energy.

Architectures of the data-flow type are usually solutions dedicated to an application domain in which the streams to be processed are well controlled and do not require complex reorganization. In such systems, the streams are managed by using dedicated memories of the FIFO type for First In First Out. In this type of architecture, all the tasks are provided in advance and for each data communication between the various tasks a specific memory space is provided and allocated. It is therefore not necessary to share the memory resources between the various tasks. In management of the dynamic reconfiguration of the architecture, a solution of the data-flow type is not suitable because it requires dimensioning all of the data streams that may be necessary and therefore all of the memory spaces for the worst case. Specifically, in the case of under dimensioning, the stream management structure imposes heavy constraints during the porting of the application. Over dimensioning conversely causes an overconsumption of energy and a loss of efficiency of the system.

The use of more complex mechanisms used for stream-processors makes it possible to dimension the data stream management structure better. Specifically, architectures of the stream-processor type are much more generalist and support applications in which the data streams are less controllable and require complex reorganization operations. Therefore the devices developed with the aid of stream-processor architectures are much more complex. Stream management in stream-processor architectures is implemented on a memory basis. The management of memory addresses, which makes it possible to reorganize the data streams, is the cause of the high cost due notably to the quantity of silicon necessary to produce such a system. Moreover, these stream-processor architectures integrate functionalities for reorganizing streams that are unused and detrimental to consumption and efficiency in applications comprising more regular data streams.

SUMMARY OF THE INVENTION

An objective of the present invention is notably to effectively dimension a data stream management structure while controlling the complexity of the data stream management structure. Accordingly, the subject of the invention is a structure and a method for backing up and restitution of data managing data streams in a shared memory space without data reorganization.

The structure for backing up and restitution of a data stream comprises notably a matrix of connectors distributed in line and in column on the matrix. Each C connector of one and the same line is notably connected to its two adjacent connectors on the line if they exist. Each connector of one and the same column is notably connected to its two adjacent connectors on the column if they exist. Each line of connectors is notably connected to a memory. The memory has, for example, a first-in, first-out type of operation. The memory can supply information on its state to the connectors of the line, by means of a connector situated at one end of the line. Each column of connectors is notably connected to an input and output port of a data stream of the structure by means of a connector, for example, situated at one end of the column. Each connector is notably capable of routing and propagating in a standalone manner a data stream entering or leaving the structure as a function of the states supplied by the memories.

A backup of a data stream can take place from an input and output port to one or more memories. The data stream passes notably through connectors of the matrix.

A restitution of a data stream can take place from the memories to an input and output port, the data stream passing through connectors of the matrix.

Each connector can route or propagate a data stream according to:
  a state of the memory connected to the line of the connector;
  a type of memory operation: read, write.
    Each connector comprises notably four interfaces:
  a first interface comprising:
    a first stream data input and, or output;
    an input of a read or write command signal;
  a second interface comprising:
    a second stream data input and, or output;
    an output of a read or write command signal;
  a third interface comprising:
    a third stream data input and, or output;
    an output of a read or write memory operation;
    an input of a memory state;
  a fourth interface comprising:
    a fourth stream data input and, or output;
    an input of a read or write memory operation;
    an output of a memory state.

The first interface of a first connector situated at one end of one of the columns is for example connected to an input and, or output port of the structure.

The third interface of a second connector situated at one end of one of the lines is for example connected to a memory of the structure.

The first and second interfaces of consecutive connectors on one and the same column are, for example, connected together.

The third and fourth interfaces of consecutive connectors on one and the same line are, for example, connected together.

A memory can have three states: empty, full and not empty.

The method for backing up and restitution of a data stream uses notably the backup and restitution structure.

The backup of a data stream may comprise the following steps:
  reception of a write command signal and of stream data to be backed-up on a first port of the structure;
  propagation of the write command signal and of the stream data in the matrix;
  arrival of the write command signal and of the data in a current connector;
if the memory of the line of the current connector is empty:
  sending by the current connector of a write control signal to the memory of the line of the current connector and marking of the current connector;
  writing of the stream data in the memory of the line of the current connector;
if the memory of the line of the current connector is not empty:
  passing of the stream data remaining to be backed-up to the next connector in the column of the current connector and resuming of the backup at the step of arrival of the write command signal in a current connector, the next connector replacing the current connector;
  the restitution of a data stream may comprise the following steps:
  reception of a data stream read command signal on the first port of the structure;
  propagation of the read command signal in the matrix;
  arrival of the read command signal in a current connector;
if the current connector is marked:
  sending by the current connector of a read control signal to the memory of the line of the current connector;
  reading of the stream data backed-up in the memory of the line of the current connector and propagation of the stream data read in the matrix up to the first port;
  cancellation of the marking of the current connector;
  passing of the read command signal to the next connector in the column of the current connector and resuming of the method at the step of arrival of the read signal in a current connector, the next connector becoming the current connector;
if the connector is not marked:
  passing of the read command signal to the next connector in the column of the connector and resuming of the method at the step of arrival of the read signal in a connector, the next connector becoming the current connector.

During the backup a state of availability of the memory of the line of the current connector may be broadcast to the current connector at its request.

The reads of the backed-up data of one and the same stream in different memories are for example carried out in parallel.

The main advantage of the invention is notably that it allows a backup and a restitution of parallel data streams independently. The allocation of the memories and the management of the addresses is advantageously automatic and requires no intervention from a designer or a third-party tool.

BRIEF DESCRIPTION OF THE DRAWINGS

Other features and advantages of the invention will appear with the aid of the following description given as an illustration and not being limiting, and made with respect to the appended drawings which represent.

DETAILED DESCRIPTION

Figure 2:
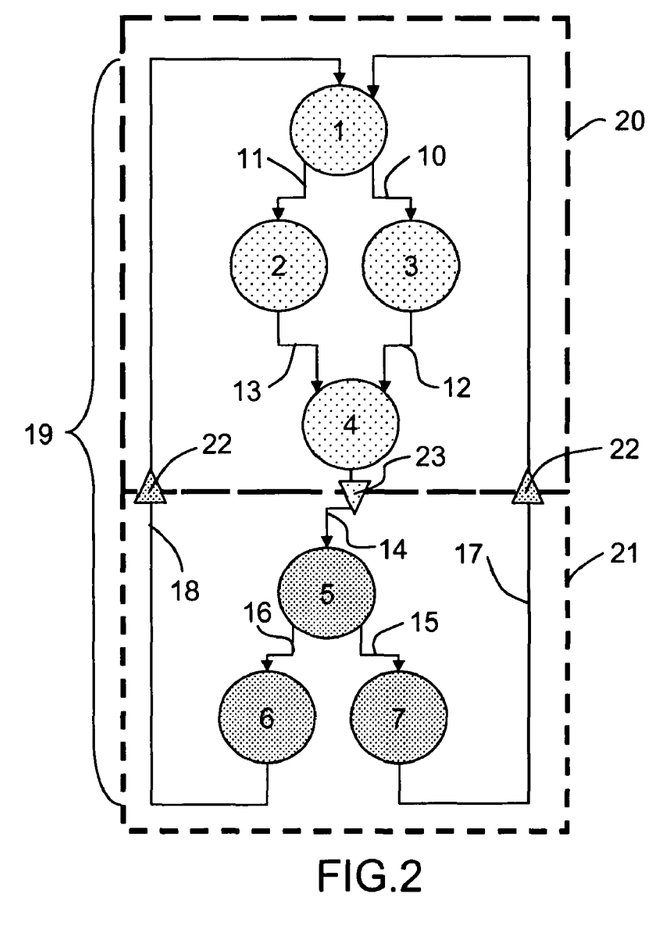
FIG. 2: an example of an application of a data stream of the Kahn process network type with two configurations.

The transition from the first configuration 20 to the second configuration 21, for example, requires a step of backing up and restitution of the contexts 22, 23. The number and the size of the contexts 20, 21 can be very variable. In order to obtain a platform with powerful dynamic reconfiguration with the least possible constraint, it is appropriate to integrate into the systems mechanisms making it possible to manage the data streams having great nonuniformity. The present invention therefore proposes a solution which, although it is applicable in other systems, takes its full meaning for the management of dynamic reconfiguration.

Figure 1:
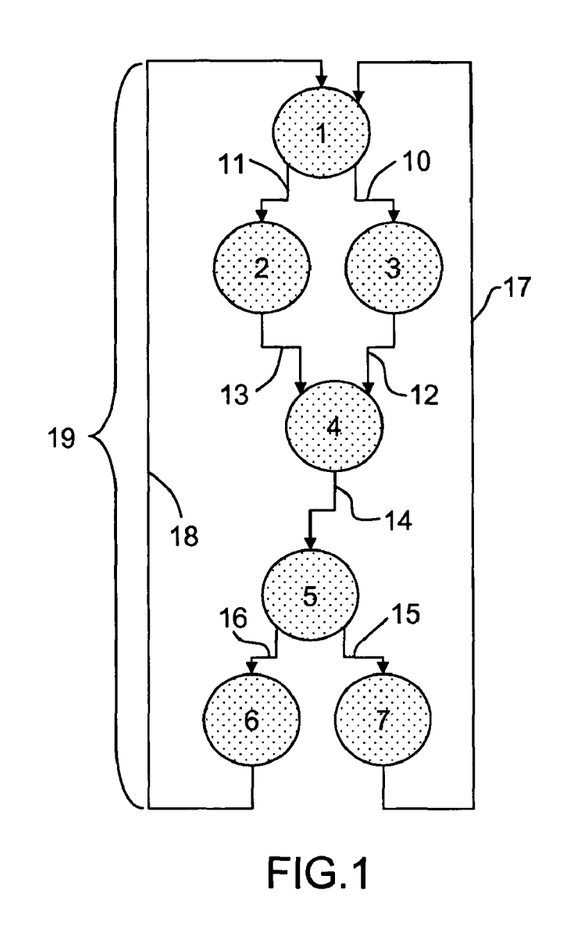
FIG. 1: an example of an application of a data stream of the Kahn process network type.

FIG. 1 represents an example of a data stream application. There is a large number of formalisms for representing a data stream application. Amongst these formalisms there are the Kahn process networks or KPN. A Kahn process network 19 consists of a finite set of processes 1, 2, 3, 4, 5, 6, 7, which communicate with one another via FIFO (the acronym for First In First Out) channels. The FIFO channels 10, 11, 12, 13, 14, 15, 16, 17, 18 notably have an infinite storage capacity. FIG. 1 represents an example of a KPN network comprising seven processes 1, 2, 3, 4, 5, 6, 7. Each process 1, 2, 3, 4, 5, 6, 7 can carry out reads which are blocking and writes, non-blocking, on a specified channel. Moreover, a KPN network 19 notably observes the following rule: an FIFO channel can be connected to only one input process and to only one output process. For example, in FIG. 1, a first FIFO channel 11 is connected to a first input process 1 and to a second output process 2. In the same manner, a second FIFO channel 10 is connected to the first input process 1 and to a third output process 3. In a KPN network 19 the activity of the tasks is dependent only on the available data. In a real system, it is necessary to consider FIFO channels of limited size and to schedule the processes. If, for any reason, the real system must be stopped, the data that are present on each FIFO channel in use must be backed-up in order to be able to resume the process subsequently. This is clearly the case for a circuit reconfiguration of the system: in this case, a context will be composed of the FIFO channels in use. The KPN processes are then grouped together and scheduled so as to obtain configurations corresponding to sub-portions of the overall application as shown in FIG. 2.

FIG. 2 represents a KPN network 19 with two configurations 20, 21. A first configuration 20 may comprise: the first process 1, the second process 2, the third process 3 and a fourth process 4. A second configuration 21 may comprise: a fifth process 5, a sixth process 6 and a seventh process 7. The borders between the two configurations 20, 21 make it possible to identify the contexts to be transmitted. For example, the border 25 between the two configurations 20, 21 makes it possible to identify a first context 23 to be transmitted consisting of a third FIFO channel 14 connected to the fourth input process 4, the fourth process 4 forming part of the first configuration 20, and to the fifth output process 5, the fifth process 5 forming part of the second configuration 21. In the same manner, it is possible to identify a second context 22 consisting of a fifth FIFO channel 17 and a sixth FIFO channel 18. The fifth FIFO channel 17 is connected to the seventh input process 7, the seventh process 7 forming part of the second configuration 21, and to the first output process 1, the first process 1 forming part of the first configuration 20. The sixth FIFO channel 18 is connected to the sixth input process 6, the sixth process 6 forming part of the second configuration 21, and to the first output process 1, the first process 1 forming part of the first configuration 20.

The configurations 20, 21 may have very different natures as a function of the circuit architectures to which they apply. For example, a reconfigurable circuit may be coarse-grain as in XPP (the acronym for extreme processing platform) architectures or for example in DART architectures which are dynamically reconfigurable architectures. A coarse-grain circuit comprises computing elements associated with an operation called complex such as an arithmetic multiplication. The circuit may also be a fine-grain circuit such as an FPGA. A fine-grain circuit comprises computing elements associated with a first-level logic operation such as an "or", "and" operation.

Figure 3:
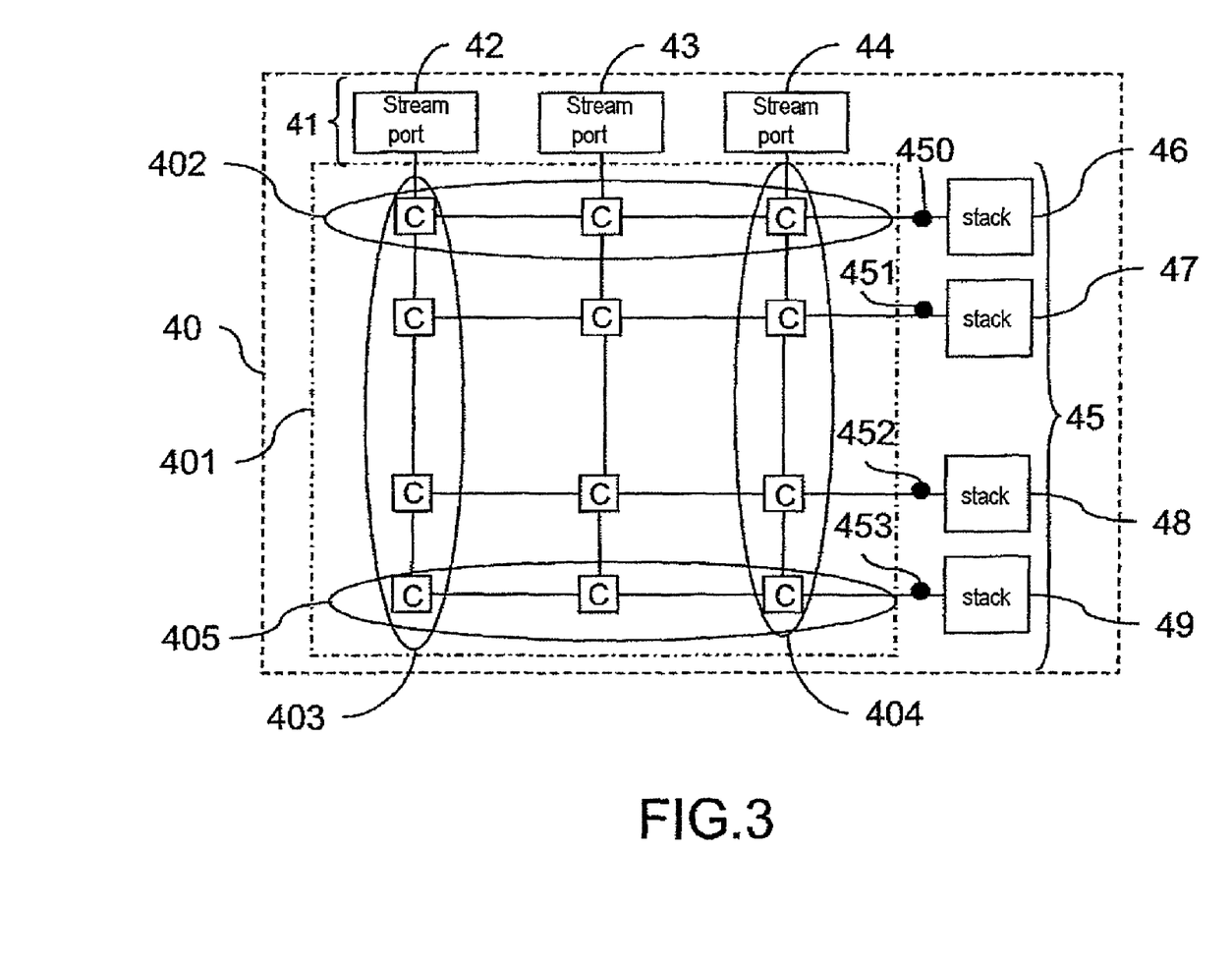
FIG. 3: a schematic representation of a backup and restitution structure according to the invention.

FIG. 3 represents schematically a data backup and restitution structure 40 according to the invention. The data backup and restitution structure 40 forms part of a system managing notably a data stream production and consumption in order to carry out the process that is assigned to it. The backup and restitution structure 40 allows a data backup notably in a set of memory banks inside the system. The backed-up data originate for example from computing components of the system. The backup and restitution structure 40 also allows a restitution of the backed-up data, in the internal memory banks, destined for other components of the system.

The backup and restitution structure 40 notably consists of three types of resources.

A first type of resource is a first vector 41 comprising a whole number n, greater than one, of stream ports 42, 43, 44. In FIG. 3, three stream ports 42, 43, 44 are represented as an example. A stream port 42, 43, 44 comprises at least one data stream input/output allowing the circulation of each stream datum and control signals. The data streams are notably received by other components of the system and, or, intended for other components of the system, external to the backup and restitution structure 40. The control signals make it possible to select an operation to be carried out by a memory of the backup and restitution structure 40: either a read for data restitution, or a write for a data backup.

A second type of resource is a second vector 45 of a number p, an integer greater than one, of memories 46, 47, 48, 49. In FIG. 3, as an example, four memories 46, 47, 48, 49 are represented. The four memories 46, 47, 48, 49 represented in FIG. 3 can be stacks. The stack concept characterizes an operation of the memory that can preferably be an FIFO memory. The use of an FIFO memory is particularly pertinent in the backup and restitution structure 40 according to the invention. The memories 46, 47, 48, 49 are each connected to one of the memory input/output ports 450, 451, 452, 453. A memory input/output port 450, 451, 452, 453 makes it possible to carry stream data, information on the state of the memory: empty, not empty or full, and control signals of the memory operations allowing the writing of data in memory or the reading of data in memory. A data read in memory may be carried out on receipt by the memory of a control signal called pull, for example. A data write in memory may be carried out on receipt by the memory of a control signal called push, for example.

A third type of resource consists of a network of interconnections 401 between the first vector of ports 41 and the second vector of memories 45 by means of the memory input/output ports 450, 451, 452, 453. The interconnections network 401 can be produced in the form of a matrix 401 of C connectors. The size of the matrix 401 of C connectors is determined by the number of data stream ports 42, 43, 44 and the number of memories of the structure 40. The matrix 401 of C connectors may for example comprise n×p C connectors. In FIG. 3, the matrix 401 represented comprises, as an example, twelve C connectors.

The matrix organization of the C connectors makes it possible to associate each memory 46, 47, 48, 49 with a chained line of C connectors. For example, a first chained line 402 can be associated with a first memory 46, a second chained line 405 can be associated with a second memory 49. The matrix organization of the C connectors also makes it possible to associate each stream port 42, 43, 44 with a chained column of C connectors. For example, a first chained column 403 can be associated with a first stream port 42, a second chained column 404 can be associated with a second stream port 44. Each C connector can therefore transmit the control information and the stream data either to another line of C connectors or to another column of C connectors.

The C connectors used in the backup and restitution structure 40 according to the invention can be transistors made by means of multiplexers for example.

The stacks 46, 47, 48, 49 may comprise a memory or else several cascaded memory registers.

The matrix structure of the backup and restitution structure 40 according to the invention advantageously allows backups and restitution of data streams in a parallel and concurrent manner.

Figure 4:
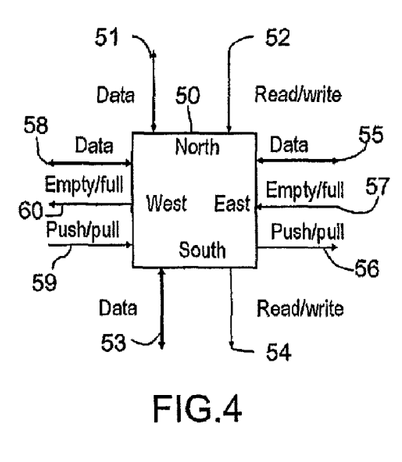
FIG. 4: a schematic representation of the interfaces of a connector of the backup and restitution structure according to the invention.

FIG. 4 represents schematically an example of a connector 50 representing each of the C connectors of the matrix 401 represented in FIG. 3. The connector 50 comprises for example four interfaces called, in FIG. 4: North, South, East, West.

The East and West interfaces of the connector 50 notably make it possible to connect the latter with two C connectors adjacent to the connector 50, if they exist, positioned on the same line as the connector 50 in the matrix 401, on either side of the connector 50.

The North and South interfaces of the connector 50 notably make it possible to connect the latter with two C connectors adjacent to the connector 50, if they exist, positioned on the same column as the connector 50, on either side of the connector 50.

The North interface of the connector 50 comprises notably:
a first stream data input/output 51;
command inputs 52 making it possible to carry command signals of the write or read type.

The South interface of the connector 50 comprises notably:
a second stream data input/output 53;
command outputs 54 making it possible to carry command signals of the write or read type.

The East interface of the connector 50 comprises notably:
a third stream data input/output 55;
outputs of control signals of memory operations 56 carrying for example the push and pull information;
a first states input/output 57, empty or full, of the memory situated on the line of the connector 50.

The West interface of the connector 50 comprises notably:
a fourth stream data input/output 58;
inputs of control signals of memory operations 59 carrying for example the push and pull information;
a second states input/output 60, empty or full, of the memory situated on the line of the connector 50.

The push and pull memory operations correspond reciprocally to a write operation and to a read operation in the memory 46, 47, 48, 49. The terms push and pull are notably associated with the use of a stack for producing the memory 46, 47, 48, 49.

The East interface of a first C connector is connected to the West interface of a second C connector adjacent to the first C connector, if it exists, on the same line of the matrix 401 as the first C connector.

The West interface of the first C connector is connected to the East interface of a third C connector adjacent to the first C connector and symmetrical with the second C connector relative to the first C connector, on the same line of the matrix 401 as the first C connector, if it exists.

The North interface of the first C connector is connected to the South interface of a fourth C connector adjacent to the first C connector, if it exists, on the same column of the matrix 401 as the first C connector.

The South interface of the first C connector is connected to the North interface of a fifth C connector adjacent to the first C connector and symmetrical with the fourth C connector relative to the first C connector, on the same column of the matrix 401 as the first C connector, if it exists.

This is how a matrix organization of the C connectors is obtained.

Each C connector of the first line 402 of the matrix 401 is connected to a stream port 42, 43, 44 via its North interface.

Each C connector of the last column 404 of the matrix 401 is connected to a memory 46, 47, 48, 49 via its East interface.

The C connectors of the first column 403 have no West interface or their West interface is not connected. The C connectors of the last line 407 of the matrix 401 have no South interface or their South interface is not connected. Any attempt to access the South or West interfaces of the unconnected or nonexistent C connectors may be used to detect an error of use of the structure 40. An error of use of the structure 40 may occur for example when there is no more room in a memory for the backup, when the data are not found. An error of use detected in this way can be communicated to a processor using the structure 40, informing it in this way of too large a number of data loaded relative to the size of the structure 40 for example.

It is possible to distinguish, in the structure 40 thus composed, two types of information streams: the data backup streams and the data restitution streams, and two states of the information streams inside the C connectors: connected and unconnected. The backup and restitution streams comprise all of the data, the write or read command signals, the memory operation control signals, the memory states.

Figure 5:
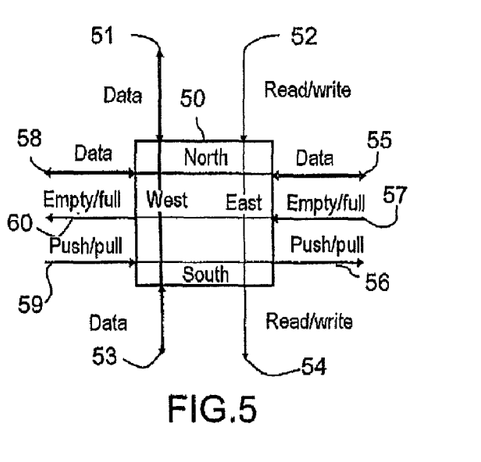
FIG. 5: a schematic representation of a connector in an unconnected state.

FIG. 5 represents schematically a connector 50 in a state called stream unconnected. When the connector is in the stream unconnected state, the stream data 51, 53 originating from a stream port 42, 43, 44 or from another connector and the read or write command signals 52, 57 are interconnected inside the connector 50 between the North interface and the South interface of the connector 50. In the same manner, the stream data 58, 59, the memory states 57, 60, and the memory operations 56, 59 are interconnected inside the connector 50 between the East interface and the West interface of the connector 50. The connector 50, when it is in the unconnected stream state, therefore allows all the information that it receives to pass to an adjacent connector if it exists. A connector 50 in an unconnected stream state therefore propagates the information that it receives.

Figure 6:
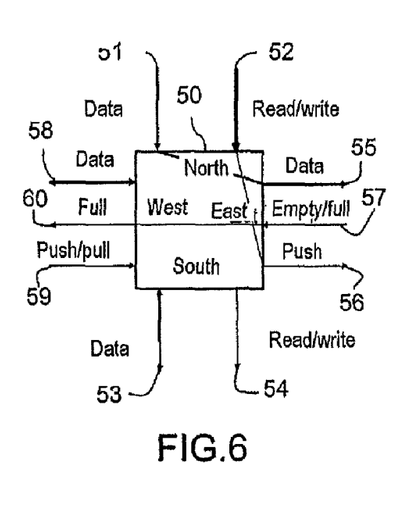
FIG. 6: a schematic representation of a connector in a connected backup stream state.

FIG. 6 represents schematically a connector 50 in a state called backup stream connected. When the connector 50 is in the backup stream connected state, the stream data 51 originating from a stream port 42, 43, 44 are interconnected inside the connector 50 between the North interface and the East interface. The stream data entering through the first stream data input/output 51 of the North interface are therefore directed toward the third stream data input/output 55 of the East interface. A reception of a write command signal originating from a stream port 42, 43, 44, on the command input 52 of the North interface causes an output of a control signal of a memory operation 56 from the East interface. The control signal of a memory operation carries an item of information of the push type, corresponding to a write in a memory 46, 47, 48, 49 as part of the backup. Since a backup operation is in progress, on the line of the connector 50, the fourth memory state output 60 of the West interface carries a memory state of the not empty type, or disables the empty signal, in order notably to prevent another connector situated on the same line as the connector 50 from writing information in the memory 46, 47, 48, 49. Specifically, the not empty memory state is then propagated to the C connectors situated to the west of the C connector. The not empty memory state is also used for each C connector to know whether the stack or memory 46, 47, 48, 49 associated with the line of the connector 50 contains data. In both cases, a not empty memory state means that the stack or memory 46, 47, 48, 49 is not available for backing up data of a stream. The generation of a not empty memory state in this case can be carried out either by the connector 50 itself or by the stack 46, 47, 48, 49, associated with the line of the connector 50.

In this case, the stream data inputs 55 of the East interface and the stream data outputs 58 of the West interface are not connected inside the connector 50. In the same manner, the memory state inputs/outputs 60, 57 of the East and West interfaces are not interconnected inside the connector 50.

A connector 50 in the connected backup stream state therefore makes it possible to route and to propagate the data streams.

Figure 7:
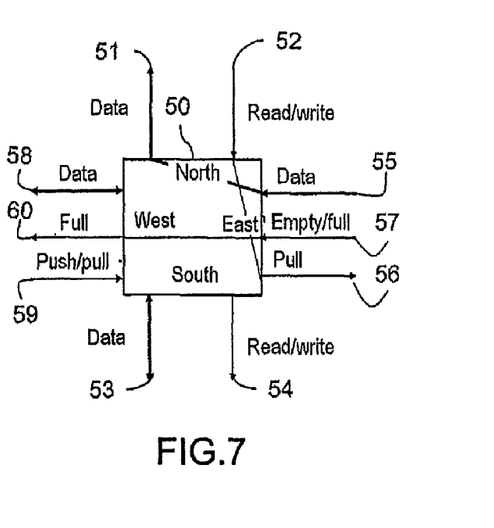
FIG. 7: a schematic representation of a connector in a connected restitution stream state.

FIG. 7 represents schematically a connector 50 in a connected restitution stream state. When the connector 50 is in the connected restitution stream state, the stream data destined for the stream ports 42, 43, 44 and a read command signal originating from a memory 46, 47, 48, 49, situated on the line of the connector 50, are interconnected between the North interface and the East interface of the connector 50. Specifically, the stream data received on the third stream data input/output 55 of the East interface leaves the connector via the first stream data input/output 51 of the North interface. Moreover, the receipt of a read command signal on the command input 52 of the North interface causes the generation of a memory operations control signal of the pull type on the first control signals output 56 of the East interface.

The third and fourth stream data inputs/outputs 55, 58 of the East and West interfaces are unconnected inside the connector 50.

A memory state signal containing the memory full information is propagated to the connectors situated to the west of the connector 50 starting from the second states output 60 of the West interface. This memory full state may originate either from the connector 50 itself or from the memory 46, 47, 48, 49 situated at the end of the line of the connector 50 in the matrix 401 of the C connector.

A connector 50 in a connected restitution stream state makes it possible to route and propagate the data streams.

Figure 8:
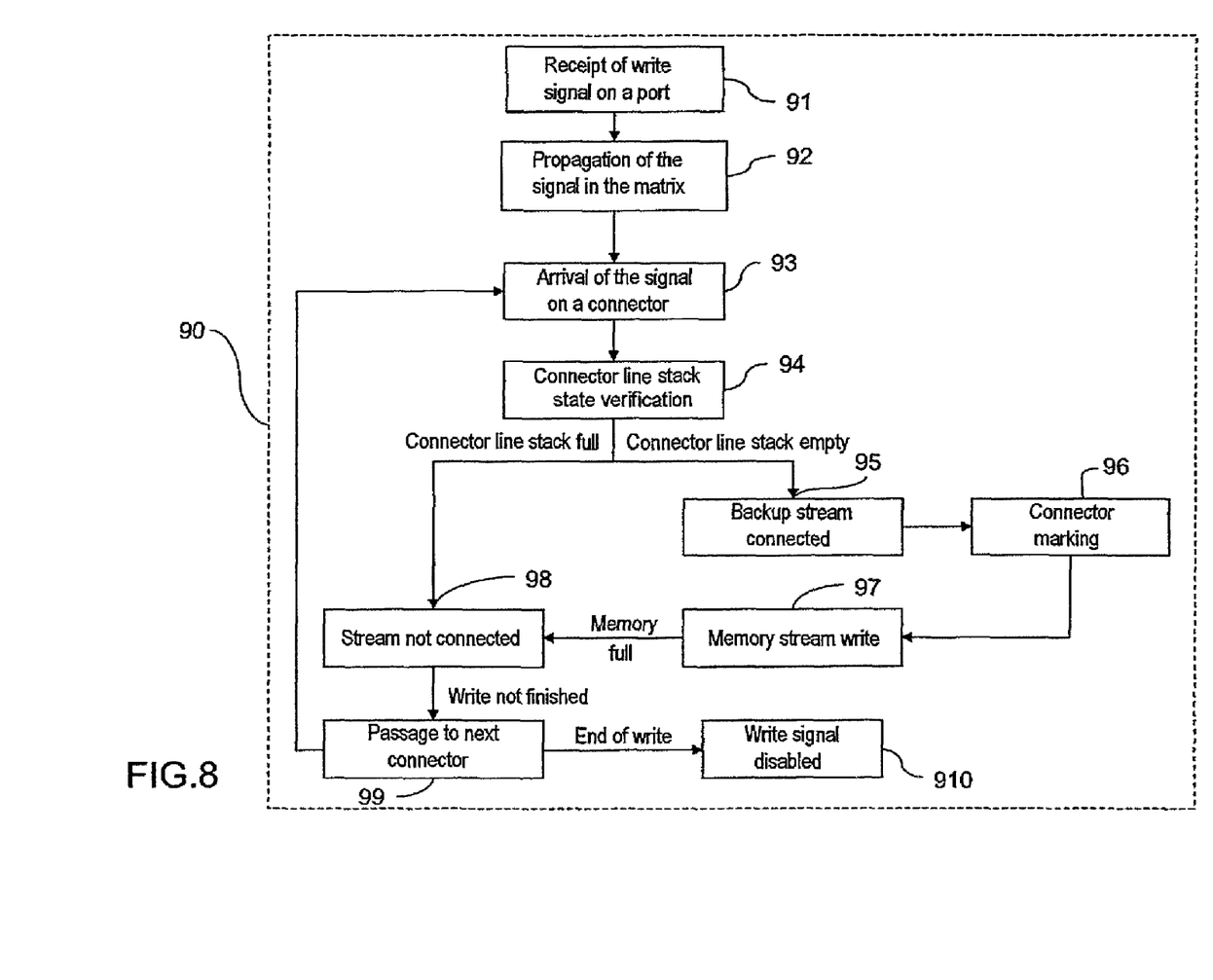
FIG. 8: various possible steps of the backup method according to the invention.

FIG. 8 represents various possible steps of the backup portion 90 of the backup and restitution method according to the invention, using the backup and restitution structure 40 according to the invention.

In an initial state of the matrix 401 of C connectors shown in FIG. 3, all the C connectors are in the unconnected stream state.

A first step 91 of the backup portion 90 according to the invention is a step of receiving a write command signal on a stream port 42, 43, 44 of the structure 40. The first reception step 91 may be carried out by activating a write command signal on a stream port 42, 43, 44. On activation of the read command signal on a stream port 42, 43, 44, the stream data present on the stream port 42, 43, 44 can be backed up.

The write command signal is then propagated from the stream port 42, 43, 44 through the matrix 401 of C connectors during a second step 92 of the backup method 90.

A write signal then arrives on a C connector positioned on the column of the stream port 42, 43, 44, called the current connector below, during a third step 93 of the backup method 90.

A verification 94 of the state of the stack of the line of the current connector is then carried out by means of the memory state signal. This verification 94 forms part of a fourth step 94 of the backup portion 90.

If the stack of the line of the current connector is empty, the current connector switches to the connected backup stream state during a fifth step 95. Therefore the stream data and a write request are transmitted to the stack 46, 47, 48, 49 situated on the line of the current connector. The write request is transmitted by means of a push memory operation control signal for example.

Then, during a sixth step 96, the connector is marked so as to be able to identify the C connectors that have been used to back up data in a stack 46, 47, 48, 49 in the restitution phase explained in detail below.

A seventh step 97 is a step of writing stream data in memory in order to carry out the backup of these data.

When the stack 46, 47, 48, 49 is full, the latter sends a memory full state signal and the current connector switches to the unconnected stream state during an eighth step 98.

If the stream data write is not completed, the stream data and the control signals are propagated to a connector following the current connector in the column of the matrix 401. The passage to the next connector is a ninth step 99 of the backup method 90 making it possible to find a new stack available for backing up the rest of the stream data.

The next step is then the third step 93 of arrival of the signal on a connector: the next connector. The next connector then becomes the current connector in the steps following the third step 93: the fourth step 94, the fifth step 95, the sixth step 96, the seventh step 97, the eighth step 98 and so on until the stream data have been completely written in the memories 46, 47, 48, 49 of the structure 40 according to the invention.

When the writing of the stream data is finished, during a tenth step 910, the write command signal is disabled. It is therefore no longer propagated in the matrix 401 of C connectors.

After the fourth step 94, if the stack 46, 47, 48, 49 of the line of the current connector on which the signal arrives is full, the current connector switches to the unconnected stream state during the eighth step 98 and then there is a switch to the next connector in the column of the current connector during the ninth step 99 in order to continue the backup portion 90 until the stream data have been completely written in memory.

The stream data thus backed up remain stored in the stacks of the structure 40 until they are restituted.

The switch from a stack 46, 47, 48, 49 to a next stack 46, 47, 48, 49 in order to back up all of the stream data is caused by the activation of the full signal by the stack 46, 47, 48, 49. If several cycles are necessary to back up all of the stream data and the full signal is generated when the storage limit is reached by a stack, other stream data that may be transmitted to the port during this time may be lost.

The full signal is therefore, in this case, routed to the C connector of the column of the matrix 401 that is furthest from the stack 46, 47, 48, 49 taking account of the write time. On each write in the stack, the full signal is therefore transmitted to a new column, so each connector of the matrix 401 receives the full signal sufficiently in advance so as not to cause data loss. The full signal is therefore transmitted to the connectors before the stack is full, for example at the beginning of the write in the stream data stack.

Other mechanisms may be used in the management of the structure 40. Amongst them, when a connector tries to back up stream data in the stack 46, 47, 48, 49 corresponding to this connector, the latter can send a request to the stack to ascertain whether it may or may not use it in order to carry out the backup. This request and the stack 46, 47, 48, 49 can be transmitted from connector to connector of the same line to the stack 46, 47, 48, 49 by the West and East interfaces of each connector of the line. If the request travels through a connector having already carried out a request, this connector can forward to the connector requesting a signal indicating that the stack is not available. On reception of the stack unavailable signal, the connector can switch to unconnected stream mode so as to find a new backup stack 46, 47, 48, 49 for the stream data. This usage makes it possible to prevent two backup requests using the same stack at the same time, specifically this can cause a loss of data.

A management of parallel data backup requests can also be used upstream of the structure 40: in the processor using the structure 40 for example.

Figure 9:
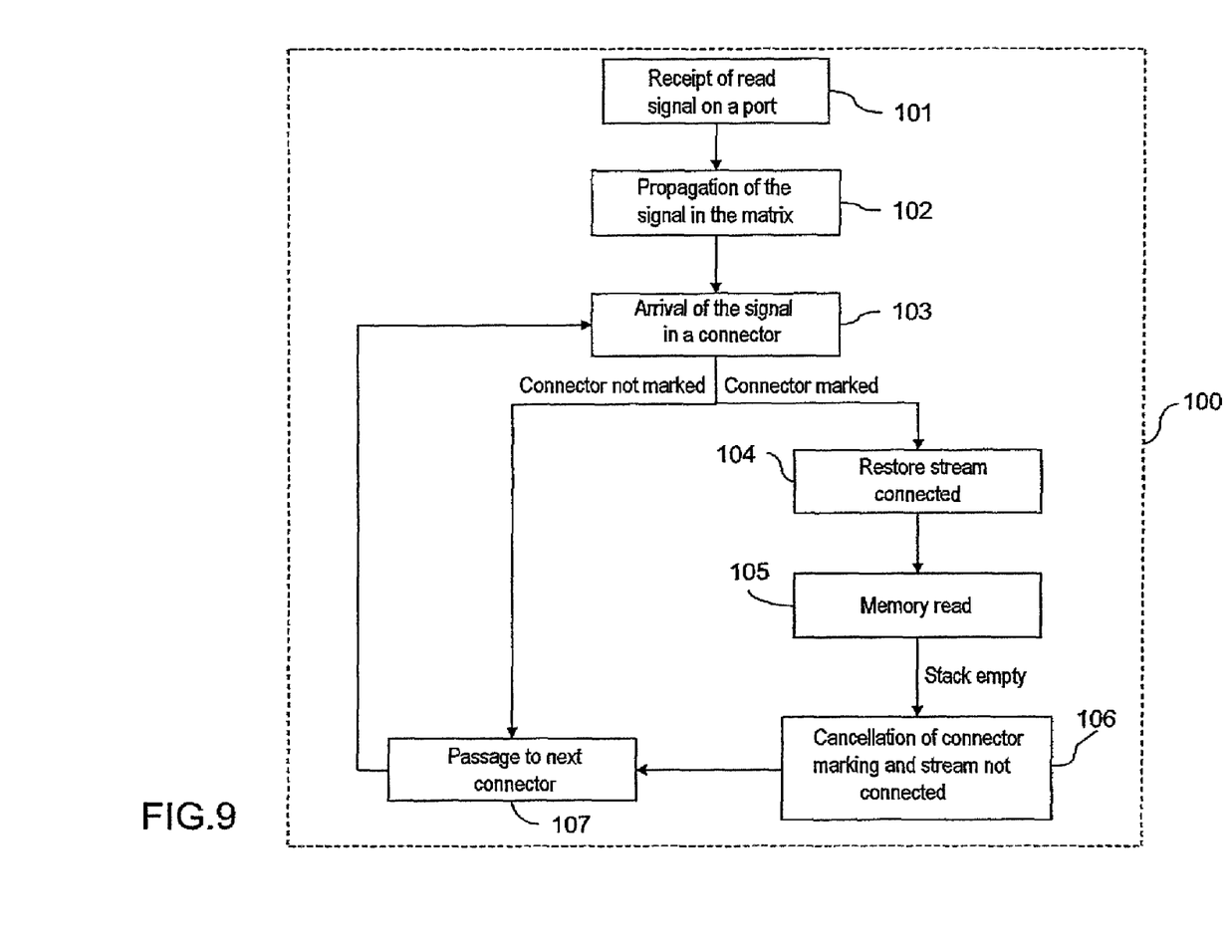
FIG. 9: various possible steps of the restitution method according to the invention.

FIG. 10 represents various possible steps of the restituted portion 100 of the backup and restitution method according to the invention, using the structure 40 according to the invention.

A restitution of data backed up in a stack 46, 47, 48, 49 of the structure 40 begins with an eleventh step 101 of receiving a read signal on the port 42, 43, 44 of the structure 40 that has been used to back up the stream data to be restituted.

The receipt of a read signal causes the propagation of a read command signal in the matrix 401 of C connectors during a twelfth step 102. The command signal is propagated in the matrix 401 of connectors in an axis defined by the North and South interfaces of the C connectors.

When the command signal arrives at a connector, hereinafter called the current connector, during a thirteenth step 103, a verification of the marking of the current connector is carried out. Specifically, if the current connector has been used to back up the stream data, it has been marked during the sixth step 96 of the backup method. The first marked connector encountered is, because of the matrix structure of the structure 40, the first connector used during the backup.

If the current connector is marked, a fourteenth step 104 is a step of the connector switching to the connected restitution stream state. Then a pull control signal is transmitted to the stack 46, 47, 48, 49 situated on the line of the current connector so that it restitutes the data that it has saved.

A fifteenth step 105 is therefore a step of reading the stream data in the memory. The data restituted by the memory then pass through the current connector to the port that has transmitted the read command signal.

Once the stack is empty, the marking of the connector is cancelled during a sixteenth step 106 and the current connector switches to the unconnected stream state.

During a seventeenth step 107, there is a switch to the connector following the current connector in the column, in order if necessary to continue the reading of the stream data. The next connector becomes the current connector in order to resume the various steps of the restituted portion 100 starting from the thirteenth step 103.

If the current connector is not marked, there is a direct switch to the seventeenth step 107, that is to say to the next connector. In this case, the restitution request is transmitted to the connectors of the next lines until the connector that has been used to back up the stream is found.

Restituting the stream data backed up on several different stacks 46, 47, 48, 49 can cause latencies at the time of the change of stack. These latencies cause holes in the restituted streams. The latencies may be managed in different ways.

A first method for managing the latencies may be an addition of valid data information to the stream data coming from the various stacks, so that an external component, retrieving the stream data, can manage the latencies.

A second method that can be applied uses the read command signal: specifically it is possible to have the read command signal transferred between the consecutive connectors of one and the same column so as to search for all the stacks that have been used to back up the stream data. The transfer of the read command signal in a connector can be carried out by interconnecting the command input 52 of the North interface with the command output 54 of the South interface of the connector. Each stack that has backed up a portion of the stream data then begins to transmit the portion of stream data that they have saved. The reading of the stream data by each memory and the transmission of these data are therefore carried out in parallel. The uploading of the stream data portions through the connectors to the port therefore stops at any connector in the connected restitution stream state in order to prevent any data overwriting. Therefore, during the switchover of the blocking connector to the unconnected stream state, the next portion of the stream is directly available. This therefore makes it possible to delete the latencies during the change of stack that takes place during the restitution of a stream.

The structure 40 according to the invention makes it possible to back up or restitute data streams between data producer tasks and data consumer tasks in electronic systems.

Advantageously, the structure 40 and the backup and restitution method 90, 100 according to the invention makes it possible to manage data streams of which the sizes may vary as a function of the producer and consumer tasks and makes it possible to support the management of several streams in parallel.

Moreover, the streams can be managed totally independently and at less cost. Specifically, the memory size is shared for all the data streams and the method according to the invention prevents the creation of shared resources: one stack is used to store a single stream datum.

Another advantage of the invention is that the management of the memory space is automatic. Specifically, a user of the structure 40 according to the invention does not have to supply information on the location of the data in the memory space of the structure 40. It is sufficient for the user to connect a stream to a port of the structure 40 according to the invention and to control the desired operation, backup or restitution.

The invention makes it possible to solve at less implementation cost the management of backing up streams that vary in size, in frequency and in duration, requiring no reorganization. The present invention notably makes it possible to implement processes on dynamic reconfiguration platforms.

The invention claimed is:

1. A structure for backing up and restoration of a data stream comprising a matrix of connectors distributed in line and in column on said matrix:
   each connector of one and the same line being connected to its two adjacent connectors on the line if they exist;
   each connector of one and the same column being connected to its two adjacent connectors on the column if they exist;
   each line of connectors being connected to a memory having a first-in, first-out type of operation, said memory supplying information on its state to the connectors of the line by means of a connector situated at one end of the line;
   each column of connectors being connected to an input and output port of a data stream of the structure by means of a connector situated at one end of the column;
   each connector being capable of routing and propagating in a standalone manner a data stream entering or leaving the structure, as a function of the states supplied by the memories.

2. The structure as claimed in claim 1, wherein a backup of a data stream takes place from an input and output port to one or more memories, the data stream passing through one or more connectors of the matrix.

3. The structure as claimed in claim 1, wherein a restitution of a data stream takes place from the memories to an input and output port, the data stream passing through one or more connectors of the matrix.

4. The structure as claimed in claim 1, wherein each connector routes or propagates a data stream according to either:
   a state of the memory connected to the line of the connector; or
   a type of memory operation: read, write.

5. The structure as claimed in claim 1, wherein each connector comprises at least four interfaces:
   a first North interface comprising:
      a first stream data input and, or output;
      an input of a read or write command signal;
   a second South interface comprising:
      a second stream data input and, or output;
      an output of a read or write command signal;
   a third East interface comprising:
      a third stream data input and, or output;
      an output of a read or write memory operation;
      an input of a memory state;
   a fourth West interface comprising:
      a fourth stream data input and, or output;
      an input of a read or write memory operation;
      an output of a memory state.

6. The structure as claimed in claim 5, wherein:
   the first North interface of a first connector situated at one end of one of the columns is connected to an input and, or output port of the structure;
   the third East interface of a second connector situated at one end of one of the lines is connected to a memory of the structure;
   the first and second North and South interfaces of consecutive connectors on one and the same column are connected together;
   the third and fourth East and West interfaces of consecutive connectors on one and the same line are connected together.

7. The structure as claimed in claim 5, wherein the memory includes three states: empty, full and not empty.

8. A method for backing up and restitution of a data stream, using the backup and restitution structure as recited in claim 1, wherein:
   the backup of a data stream comprises at least the following steps:
      reception of a write command signal and of stream data to be backed-up on a first port of the structure;
      propagation of the write command signal and of the stream data in the matrix;
      arrival of the write command signal and of the data in a current connector;
      if the memory of the line of the current connector is empty, then performing the following steps:
      sending by the current connector of a write control signal to the memory of the line of the current connector and marking of the current connector;
      writing of the stream data in the memory of the line of the current connector;
      if the memory of the line of the current connector is not empty, then performing the following steps:
         passing of the stream data remaining to be backed-up to the next connector in the column of the current connector and resuming of the backup at the step of arrival of the write command signal in a current connector, the next connector replacing the current connector;
   the restitution of a data stream comprises at least the following steps:
      reception of a data stream read command signal on the first port of the structure;
      propagation of the read command signal in the matrix;
      arrival of the read command signal in a current connector;
      if the current connector is marked:
         sending by the current connector of a read control signal to the memory of the line of the current connector;
         reading of the stream data backed-up in the memory of the line of the current connector and propagation of the stream data read in the matrix up to the first port;
         cancellation of the marking of the current connector;
         passing of the read command signal to the next connector in the column of the current connector and resuming of the method at the step of arrival of the read signal in a current connector, the next connector becoming the current connector;

if the connector is not marked:
    passing of the read command signal to the next connector in the column of the connector and resuming of the method at the step of arrival of the read signal in a connector, the next connector becoming the current connector.

9. The method as claimed in claim 8, wherein during the backup, a state of availability of the memory of the line of the current connector is broadcast to the current connector at its request.

10. The method as claimed in claim 8, wherein the reads of the backed-up data of one and the same stream in different memories are carried out in parallel.

* * * * *